United States Patent
Abraham et al.

(10) Patent No.: US 11,188,864 B2
(45) Date of Patent: Nov. 30, 2021

(54) CALCULATING AN EXPERTISE SCORE FROM AGGREGATED EMPLOYEE DATA

(71) Applicant: International Business Machines Corporation, Armonk, NY (US)

(72) Inventors: Subil M. Abraham, Lewisville, TX (US); Jason A. Gonzalez, Lewisville, TX (US); Keeley M. Lundquist, Frisco, TX (US)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 15/193,864

(22) Filed: Jun. 27, 2016

(65) Prior Publication Data
US 2017/0372249 A1 Dec. 28, 2017

(51) Int. Cl.
G06Q 10/06 (2012.01)
G06F 16/31 (2019.01)
G06F 16/2455 (2019.01)
G06F 16/23 (2019.01)

(52) U.S. Cl.
CPC ....... *G06Q 10/06393* (2013.01); *G06F 16/23* (2019.01); *G06F 16/2455* (2019.01); *G06F 16/313* (2019.01)

(58) Field of Classification Search
None
See application file for complete search history.

(56) References Cited

U.S. PATENT DOCUMENTS

| | | | | |
|---|---|---|---|---|
| 5,715,468 A | * | 2/1998 | Budzinski | G06F 16/36 704/9 |
| 5,774,866 A | * | 6/1998 | Horwitz | G06Q 10/063112 705/7.14 |
| 6,178,420 B1 | * | 1/2001 | Sassano | G06F 16/313 |

(Continued)

FOREIGN PATENT DOCUMENTS

WO 2011/026121 A2 3/2011

OTHER PUBLICATIONS

V. Chenthamarakshan, K. Dey, J. Hu, A. Mojsilovic, W. Riddle and V. Sindhwani, "Leveraging social networks for corporate staffing and expert recommendation," in IBM Journal of Research and Development, vol. 53, No. 6, p. 11:1-11:10, Nov. 2009, doi: 10.1147/JRD.2009.5429039. (Year: 2009).*

(Continued)

*Primary Examiner* — Shelby A Turner
(74) *Attorney, Agent, or Firm* — Aaron N. Pontikos

(57) ABSTRACT

Systems and methods of the present invention provide for one or more server computers communicatively coupled to a network and configured to: receive, from a user interface on a client, a request for a listing of subject matter experts and keywords identifying the subject matter; query a database, in response to receiving the transmission, to select employee score data records including the subject matter keywords and automatically generated in response to the server receiving an employee calendar event data or employee communication data related to the calendar event data; automatically generate: a total score by adding the employee score from each score data record including an employee identifier; and the listing of subject matter experts; and transmit the listing to the client for display.

4 Claims, 8 Drawing Sheets

(56) References Cited

U.S. PATENT DOCUMENTS

| | | | |
|---|---|---|---|
| 7,194,483 B1* | 3/2007 | Mohan | G06F 16/30 |
| | | | 707/600 |
| 7,792,786 B2* | 9/2010 | Chen | G06Q 10/06 |
| | | | 707/603 |
| 7,979,433 B2 | 7/2011 | Vora et al. | |
| 8,645,312 B2 | 2/2014 | Flinn et al. | |
| 8,645,387 B2* | 2/2014 | Hiltz-Laforge | G06F 16/335 |
| | | | 707/740 |
| 9,083,729 B1 | 7/2015 | Doshi et al. | |
| 9,519,691 B1* | 12/2016 | Danielson | G06F 16/313 |
| 10,007,707 B1* | 6/2018 | Balasia | G06F 16/248 |
| 10,296,873 B1* | 5/2019 | Balasia | G06F 16/24578 |
| 2003/0041072 A1* | 2/2003 | Segal | G06F 16/353 |
| 2004/0024739 A1* | 2/2004 | Copperman | G06F 16/353 |
| 2007/0013967 A1* | 1/2007 | Ebaugh | G06F 16/3331 |
| | | | 358/448 |
| 2008/0243833 A1* | 10/2008 | Wang | G06F 16/36 |
| 2009/0177463 A1* | 7/2009 | Gallagher | G06F 16/313 |
| | | | 704/10 |
| 2009/0276415 A1* | 11/2009 | Dane | G06F 16/313 |
| 2010/0169361 A1* | 7/2010 | Chen | G06F 16/36 |
| | | | 707/769 |
| 2012/0005209 A1* | 1/2012 | Rinearson | G06F 16/80 |
| | | | 707/737 |
| 2012/0137367 A1* | 5/2012 | Dupont | G06F 21/00 |
| | | | 726/25 |
| 2012/0150888 A1* | 6/2012 | Hyatt | G06F 21/6254 |
| | | | 707/758 |
| 2012/0197733 A1* | 8/2012 | Skomoroch | G06Q 30/02 |
| | | | 705/14.66 |
| 2014/0280592 A1 | 9/2014 | Zafarani et al. | |
| 2014/0324846 A1 | 10/2014 | Rekhi | |
| 2015/0006261 A1* | 1/2015 | Gutman | G16H 40/20 |
| | | | 705/7.39 |
| 2015/0134694 A1* | 5/2015 | Burke | G06Q 10/06398 |
| | | | 707/769 |
| 2015/0248222 A1* | 9/2015 | Stickler | G06Q 30/02 |
| | | | 715/763 |
| 2015/0248651 A1* | 9/2015 | Akutagawa | G06Q 50/01 |
| | | | 705/7.19 |
| 2016/0350400 A1* | 12/2016 | Zhu | H04L 67/02 |
| 2017/0004129 A1* | 1/2017 | Shalaby | G06F 16/367 |
| 2017/0091289 A1* | 3/2017 | Ohazulike | G06Q 10/20 |
| 2017/0161685 A1* | 6/2017 | Jennings | G06Q 10/1053 |
| 2017/0236081 A1* | 8/2017 | Grady Smith | G06Q 10/067 |
| | | | 705/7.36 |
| 2017/0308795 A1* | 10/2017 | Grom | G06F 3/04847 |

OTHER PUBLICATIONS

D. Crow and J. DeSanto, "A hybrid approach to concept extraction and recognition-based matching in the domain of human resources," 16th IEEE International Conference on Tools with Artificial Intelligence, 2004, pp. 535-541, doi: 10.1109/ICTAI.2004.12. (Year: 2004).*

* cited by examiner

| File  Edit  Tools | ⇐ ⇒ | |

HR Employee Control Panel

Enter employee name: John Doe    Location: Dallas, TX Offices ▽

Enter employee corporate contact information::

Select contact type ... ▽    john.doe@smc.com    @johndoe

Corporate Email
Company Social Media

Enter employee title/position: Project Manager    Dates of position: 1/1/16 - Now Previous positions: Web Developer (1/1/2010-1/1/2016), Scrum Master (1/1/2014-1/1/2016) ...

If employee is associated with a partner company, click here: [x]

Organization: Social Media Corp.    Dates of Partnership: 1/1/16    12/31/16

If employee is under a confidentiality agreement, click here: [x]    Restriction type ... ▽

Agreement: Internal Intranet Policies    Proprietary technology
Government Contract...

Effective Date: 1/1/16

FIG. 4

| File Edit Tools | ⇐ ⇒ | |
|---|---|---|

Project Manager Control Panel  Project Team: WebDev Team 1 ▽

Project Name: Social Media Intranet  Project Dates: 1/1/16  12/31/16

Project Goals, Missions and Objectives: Improve corporate and partner transparency through ...

Team Members: John Doe, Jane Doe ...

Friendly Teams: Management, proponents  Reasons: Support our Intranet design

Competitors: WebDev Team 2  Reasons: Competing proposed Intranet design

FIG. 5

| File Edit Tools |
|---|

Calendar/Event Planning Software

Event Name: | Social Media Intranet Web Developers Conference |

Date(s): | 1/1/16 | | 1/3/16 | [x] All Day Event

Location: | Grand Hotel, 123 Main Street, Tucson Arizona |

Room: | Ballroom 3 |

FIG. 6

File Edit Tools

Expertise Search Control Panel

Natural Language Search: Search for employees with a specific skill set:

What employees or partner employees, including those with security restraints, are subject matter experts in web development, intranets and/or social media as of January 1, 2016

Detailed Search:     Subject Matter: Web Development, Intranet

[x] Include employees from partnerships    [x] Include employees under confidentiality agreements Dates: 1/1/16   12/31/16

Results:

| Score: | Employee Name: | Notes: |
|---|---|---|
| 96 | Jane Doe | Current employee, web developer, no security agreements, social media intranet project |
| 65 | John Doe | Social Media Corp. employee, project manager, security agreement with gov't contract, social media intranet project |

FIG. 7

CALCULATING AN EXPERTISE SCORE
FROM AGGREGATED EMPLOYEE DATA

BACKGROUND

The present invention relates to calculating an expertise level of an employee from employee data aggregated in an organization's (or a partner organization's) employee database. Current organizations require a diverse range of resources. One of these resources include human resources, or the talents of the employees of the organization. Human resources departments may need to manage a diversity of employee talent, which may range from various departments within the organization, including talent resources in accounting, legal, information technology or systems, etc. Furthermore, in the current economic environment, employees may move between different departments and/or organizations. Human resource departments, therefore require the tools to track the talent pool of current and former employees.

SUMMARY

According to an embodiment of the present invention, one or more server computers communicatively coupled to a network are configured to: receive, from a user interface on a client, a request for a listing of subject matter experts and keywords identifying the subject matter; query a database, in response to receiving the transmission, to select employee score data records including the subject matter keywords and automatically generated in response to the server receiving an employee calendar event data or employee communication data related to the calendar event data; automatically generate: a total score by adding the employee score from each score data record including an employee identifier; and the listing of subject matter experts; and transmit the listing to the client for display.

BRIEF DESCRIPTION OF THE DRAWINGS

FIG. 4 is an example embodiment including a user interface used in calculating an expertise score from aggregated employee data.

FIG. 5 is an example embodiment including a user interface used in calculating an expertise score from aggregated employee data.

FIG. 6 is an example embodiment including a user interface used in calculating an expertise score from aggregated employee data.

FIG. 7 is an example embodiment including a user interface used in calculating an expertise score from aggregated employee data.

DETAILED DESCRIPTION

Figure 1:
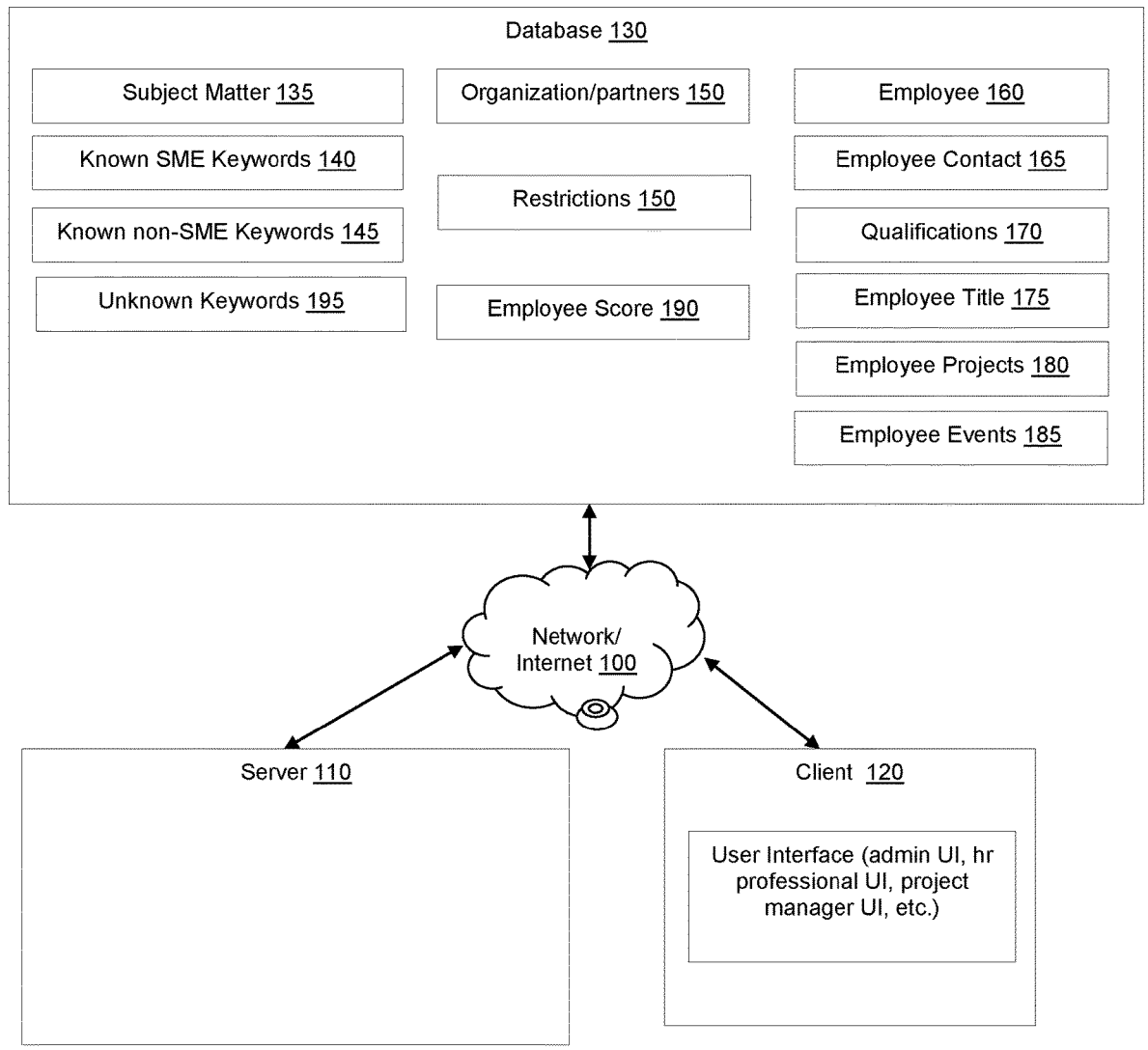
FIG. 1 illustrates a possible system for calculating an expertise score from aggregated employee data.

Embodiments of the invention provide methods and automated systems for storing, within an electronic database, one or more data records defining details of communications, calendar events, work history, security restrictions, and/or the timeliness of work experience for one or more employees. Upon receiving a request from a user interface (UI) on a client device, the methods and automated systems calculate, without user input, an expertise score for each employee, according to keywords within the aggregated employee data matching the requested subject matter.

Many enterprises today are managing hundreds of thousands of employees with highly diversified skill sets and backgrounds across disparate locations and geographies. Harnessing a large pool of such employees can present significant challenges. For example, identifying internal employee talent and SMEs is difficult even under the best of circumstances. Locating experts within such large organizations is at present a time-consuming 'hit-or-miss' task. Current systems and methods of locating such experts rely on employee self-reporting or the use of a skill database.

Embodiments of the present invention recognize that, with many industries such as the Information Technology industry, technical skills and business requirements change and transform very quickly, and using an iterative approach of identifying people based on a threshold expertise in a subject area may prove to be very ineffective in the new day and age. This problem is further compounded when we consider the complex relationships that can exist within an enterprise. For example, roles and divisions within an enterprise may change drastically based on ongoing business transformation which can impact the identification of the right resource with a particular skill-set on a given day. Similarly an enterprise may establish exclusive partnerships with other enterprises (e.g., IBM-Apple, IBM-JDA etc), which may result in the availability of new SMEs that cross organizational boundaries. Similarly new information privacy regulations or contractual agreements may limit how SMEs can assist other business units within the same enterprise for a given inquiry. Hence, such constraints can change the potential weight or score associated with set of available SMEs.

With the adoption of new collaborative technologies such as an enterprise level social platform (e.g., IBM Connections), enterprises can be more innovative in identifying resources as well as executing more quickly across established partnerships and roles which tend to be of a dynamic nature. The core focus of the embodiments and aspects of the disclosed invention is to understand the history of people's interactions, both physical and digital, to identify experiences. Using a "social fingerprint" (e.g., a record of a user's communications), historical analysis, predictive and cognitive computing, and privacy filter, the system can identify key characteristics and provide recommendations of individuals when problems are posed to the system.

Embodiments and aspects of the disclosed invention represent a significant improvement over current systems and methods, in that they overcome the issues described above. The disclosed invention utilizes one or more server computers, coupled to a network and including one or more processors executing instructions within software algorithms stored in the memory of the server(s). The instructions cause the server(s) to receive and decode a transmission from a UI displayed on a client computer (also coupled to the network), requesting a list of employees and a subject matter expertise score for each employee. The server(s), responsive to the request and without user input, select and analyze an aggregation of data records, including communication, calendar event, work history, and security restriction data records for each employee. The server(s) then compare keywords within each data record with each token identified in an identified subject matter of the request. For each keyword in each data records matching each subject-matter related token, the server(s) automatically increase the subject matter expertise score for the employee identified in the data record. The server(s) then transmit a list of identified employees, along with their subject matter expertise score, to the client(s) for display, the list possibly being ordered from highest score to lowest score. Thus, the disclosed system provides a far more holistic analysis, and therefore a far more accurate employee expertise score for a particular subject matter, than is found in currently-existing systems and methods, because the analysis is based on a far more robust aggregation of employee data.

The holistic aggregation of employee data may include data records stored in one or more data tables within a relational database coupled to the network. For example, an employee data table may store an employee's name and location. An employee restriction data table may store any restrictions on the employee sharing their expertise, and the dates of those restrictions. An employee contact data table may store contact information (e.g., corporate phone number, email address, social media handle, blog authorships or subscriptions, etc.) associated in the database with the employee. An employee qualification data table may store degrees, certifications, continuing education classes, professional conferences, etc. associated in the database with the employee, and the dates of the qualifications. An employee title/position data table may include titles/positions within an organization associated in the database with the employee, and the dates of the positions. An employee project data table may store projects, project missions, project team members, and competing project teams associated in the database with the employee, and the dates of the projects. An employee event data table may store calendar and physical location-based events (e.g., appointments, GPS locations, etc.) associated in the database with the employee, and the dates of the events.

The aggregation of the employee data may be input by any combination of system administrators (system users), human resources (HR) administrators (HR users), project managers, the employees themselves, or other system users with access to the disclosed UI and the proper authentication credentials. The aggregation of employee data may also be augmented to include employees from organizations that are partnered, either temporarily or permanently, with the company administrating the disclosed system.

The server(s) may also be configured to aggregate the employee data. For example, the server(s) may, without user input, identify each of the employee contacts for each employee in the employee contact data, and monitor each employee communication using the identified employee contact (e.g., phone call at the employee's phone number, email sent from or received at employee's email address, etc.). The server(s) may analyze character strings generated from these communications (e.g., voice to text conversion from phone call, email body content, etc.) tokenize each character string, and compare each identified token with a list of keywords associated in the database with a subject matter. The descriptions of the subject matter, as well as the list of keywords associated in the database with the subject matter, may have previously been input by a system user (or a machine learning algorithm, described below) and stored in subject matter and subject matter keyword data tables respectively.

Using the tokens generated from each employee communication, as well as tokens identified within the aggregated data for each employee, the server(s) may generate and store employee expertise score data, possibly stored as data records within an employee score data table. The employee score data table may associate each employee, each subject matter, each matching keyword identified, the date of the use of the token, and an associated score. The scores may be automatically generated either by software logic or data rules stored within the database.

Once the servers have aggregated the employee data and generated employee score data according to the employee's communications or aggregated data, users of the disclosed system may access a UI for generating a list of employees with employee score data associated with a specific subject matter, the list possibly ranking the employees from highest employee score to lowest employee score for expertise during a particular date or time. The user may generate the request as a natural language query or using a series of UI controllers, as seen in FIG. 7. The user may then submit the search to the server(s).

The server(s) may receive the request, and if necessary, identify the required request parameters from the natural language search (e.g., subject matter keywords, dates, restrictions, partnerships, etc.). The server(s) may then use the identified keywords to identify a subject matter associated with the request. For each keyword identified in the request, the server(s) may query the database to return all employee score data records associated in the database with that keyword. The server(s) may then initialize a score total for each employee identified within the returned employee score data records, and for each employee score data record associated in the database with that employee, add the score from that data record to the employee's score total. The server(s) may then generate a preliminary version of the requested list of employees and employee scores for the requested subject matter. The server(s) may then query the restriction data and/or project data to determine if each employee score needs to be adjusted according to the employee's likelihood of providing information about the searched subject matter, and/or according to the timeliness of the employee's knowledge of the subject matter.

Specifically, the server(s) may analyze the returned restriction data to determine restrictions placed on the employee (e.g., government contracts, proprietary information, local legal restrictions, etc.), and for each restriction identified, reduce that employee's score according to an amount determined by software logic or software rules stored in the database. Similarly, the server(s) may analyze the returned project data to identify competing interests that will make an employee less likely to share information related to the requested subject matter (e.g., belonging to a team competing for a similar project), and for each competing interest, reduce the employees score according to an amount determined by software logic or the software rules.

The server(s) may also adjust the employee scores in the preliminary version of the requested list according to the timeliness of the employee's subject matter expertise. To accomplish this, the server(s) may determine the date for each of the returned employee score data records associated with that employee, and if the number of records or the employee's score during a predetermined period of time is not above a pre-determined threshold, the employee's score from the preliminary version of the requested list of employees may be reduced. For example, if no date range is specified (therefore including the employee's entire employment history), software logic or software rules stored in a database table may identify a threshold amount of entries or a minimum score required during a specific time period (e.g., the most recent quarter). If the defined number of records or score during this time is not reached, the score total for the employee may be reduced according to software logic or rules.

The user may specify a range of dates on the UI, so that the requested list of employees and employee scores reflect each employee's score as of the dates selected by the user. To accomplish this, the server(s) may query the database for the employee score data records, but limit the returned data records to those that fall within the user's specified dates. The server(s) may then use the techniques above to generate the preliminary version of the requested list (limited to the specified dates) and reduce the scores according to any restrictions or projects within those dates.

The embodiments and aspects of the disclosed invention include the server(s)' ability to identify new subject matter keywords or non-subject matter keywords using machine learning. In some example embodiments, the server(s) may analyze all tokens identified within the input data (e.g., communications, employment history or event data records, etc.), and identify additional tokens not found within the subject matter keyword data table, but found in the same character string as known subject matter keywords. For each of the identified unknown tokens, the server(s) may compare the tokens with a data table of non subject matter keywords, and if the identified unknown token is not found in the subject matter keyword data table or the non subject matter keyword data table, the server(s) may insert the identified unknown token into an unknown keyword data table. Each data record in this table may include an unknown keyword id, an adjacent known keyword id (i.e., found in the same character string), the unknown keyword, and a tally of the number of times the unknown keyword exists in the same input as the associated known subject matter keyword, which is automatically incremented each time the token and keyword appear in the same input.

Each time the token and the subject matter keyword (or another known subject matter keyword) exist in the same input, the tally stored in the data record may be compared to a threshold number defined within software logic or software rules stored in the database, and if the tally is greater than or equal to the threshold number, the unknown keyword may be inserted into the subject matter keyword data table, associated with the adjacent subject matter keyword.

With reference now to FIG. 1 the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices (e.g., server(s) 110) from a computer readable storage medium or to an external computer or external storage device via a network 100, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device (e.g., server(s) 110, client(s) 120) receives computer readable program instructions from the network 100 and forwards the computer readable program instructions for storage in a computer readable storage medium within the respective computing/processing device 110, 120.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer 110, 120, partly on the user's computer 110, 120, as a stand-alone software package, partly on the user's computer 110, 120 and partly on a remote computer 120 or entirely on the remote computer or server 110. In the latter scenario, the remote computer 120 may be connected to the user's computer through any type of network 100, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
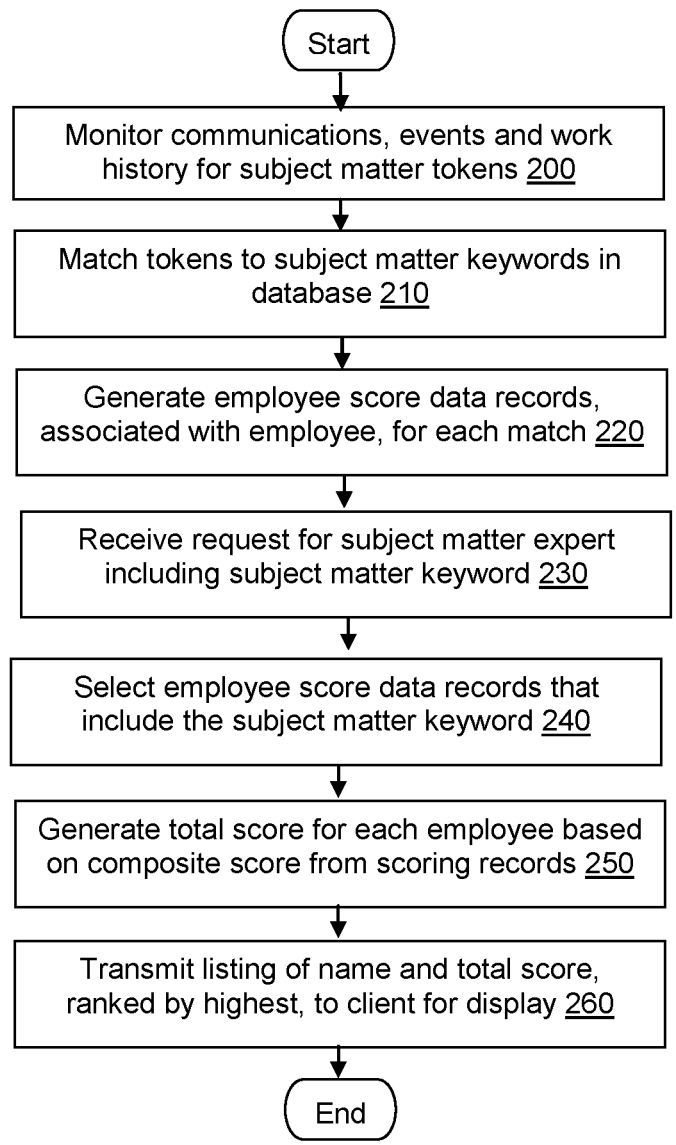
FIG. 2 is a flow diagram illustrating a possible embodiment of calculating an expertise score from aggregated employee data.

With reference now to FIG. 2, a flowchart is shown, demonstrating the current invention. In this flowchart, server(s) 110 monitor, in order to identify at least one character string comprising a token: at least one communication sent or received by an employee using at least one contact method stored in a database 130 coupled to the network 100; an event description of at least one event scheduled for the employee; and an employment history description, stored in the database, of at least one employment history event for the employee; (Step 200). Server(s) 110 then match the tokens to the subject matter keywords in the database, and query the database to select, within the database, a subject matter keyword matching the token (Step 210). For each subject matter keyword matching the token, the server(s) 110 then generate and insert, into the database, an employee score data record comprising an employee identifier, a subject matter identifier, the subject matter keyword, and an employee score (Step 220). Server(s) 110 then receive, from a user interface on a client computer 120 operatively coupled to the network 100, a transmission encoding: a request for a listing of at least one subject matter expert; and the at least one keyword identifying a subject matter for which the subject matter expert is requested (Step 230). Server(s) 110 then query the database to select, from within the database 130, at least one employee score data record comprising the subject matter keyword (Step 240). Servers then generate: a total score for each employee identifier by adding, to the total score, the employee score from each selected employee score data record comprising the employee identifier; and the listing comprising a name and the total score for each employee identifier, ranked from a highest total score to a lowest total score (Step 250). Servers then transmit the listing to the client computer 120 for display (Step 260).

Figure 3:
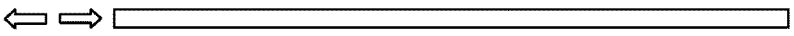
FIG. 3 is an example embodiment including a user interface used in calculating an expertise score from aggregated employee data.

With reference now to FIG. 3, a system user may access a subject matter UI, such as the non-limiting example UI seen in FIG. 3. This subject matter UI may include one or more UI controllers configured to receive input from the system user. As seen in FIG. 3, these UI controllers may include, but are not limited to: one or more subject matter UI controllers configured to receive input describing a subject matter or other industry-related title; one or more subject-matter keyword UI controllers configured to receive one or more keywords associated with the input subject matter; and one or more non-subject matter keyword UI controller s configured to receive keywords that are unrelated to any subject matter (e.g., a, an, the, my, your, his, hers, etc.). After the data is input into the provided UI controllers, the user may submit the data. The client computer 120 that displayed the UI may then transmit the input data to the server(s) 110.

Server(s) 110 may receive the transmission, including subject matter data 135, and store the subject matter data 135 within a database and/or data storage 130 coupled to the network 100. In some embodiments, the subject matter within the subject matter data 135 may be stored within its own data record, in a data table storing subject matter, such as the example data table below.

| sm-id | subject-matter |
|-------|----------------|
| 1     | Web development |
| 2     | Intranet |
| 3     | Social Media |
| ...   | ... |

Each data record in this example data table may include: a subject matter id data field storing a unique id associated with the subject matter stored within the data record; and a subject matter data field storing the title and/or description of the subject matter 135.

In the example data table above, server(s) 110 may have received the subject matter data 135 from the subject matter UI seen in FIG. 3, and automatically generated and stored the data record with a subject matter id 1, with a title/description "Web development." This example subject matter data table also includes two additional data records that may have been subsequently input into, and received from, the subject matter UI.

The transmission from the subject matter UI on client computer 120 to server(s) 110 may also include known subject matter keyword data 140, including one or more keywords known to be related to the subject matter 135. Server(s) 110 may receive the known subject matter keyword data 140 as a character string, and separate the character string into one or more tokens. In the example embodiment seen in FIG. 3, the input known subject matter keywords are separated by commas. Server(s) 110 may therefore separate the character string in this example into tokens according to the comma-separated character strings, possibly deleting additional whitespace. However, any other character string tokenization techniques known in the art may also be used to identify tokens within a character string.

Server(s) 110 may then store the tokenized keywords, from the known subject matter keyword data 140, within database 130. In some embodiments, each of the tokens identified within the known subject matter keyword data 140 may be stored within its own data record, in a data table storing one or more known subject matter keywords, such as the example data table below.

| kw-id | sm-id | subject-matter-keyword |
|-------|-------|------------------------|
| 1     | 1     | web                    |
| 2     | 1     | developer              |
| 3     | 2     | intranet               |
| 4     | 2     | corporate              |
| ...   | ...   | ...                    |

Each data record in this example data table may include: a keyword id data field storing a unique id associated with the known subject matter keyword tokenized from the character string and stored within the data record; a subject matter keyword id referencing a data record within the subject matter data table and identifying a subject matter associated with the keyword id; and a keyword data field storing the token/character string making up the subject matter keyword.

In the example data table above, server(s) 110 can receive the subject matter keyword data 140 from the subject matter UI seen in FIG. 3, automatically identify one or more tokens within the received subject matter keyword data 140 (e.g., "web, developer, etc."), and automatically generate and store data records for each of the identified tokens in the subject matter keyword data 140, the data record having subject matter id 1 storing the subject matter keyword "web," the data record having subject matter id 2 storing the subject matter keyword "developer" and so on. This example subject matter data table also includes additional data records that may have been subsequently entered from the subject matter UI controller, or automatically generated by server(s) 110 using the machine learning algorithms described below.

The transmission from the subject matter UI on client computer 120 to server(s) 110 may also include non-subject matter keyword data 145, including one or more keywords known to be unrelated to any subject matter 135. Server(s) 110 may receive the non-subject matter keyword data 145 as a character string, and separate the character string into one or more tokens, possibly using the comma-separated values to identify tokens in the character string, as described above. However, any other character string tokenization techniques known in the art may also be used.

Server(s) 110 may then store the tokenized keywords from the non-subject matter keyword data 145 within the database 130. In some embodiments, each of the tokens identified within the non-subject matter keyword data 145 may be stored within its own data record, in a data table storing one or more non-subject matter keywords, such as the example data table below.

| nsmkw-id | non-subject-matter-keyword |
|----------|----------------------------|
| 1        | a                          |
| 2        | an                         |
| 3        | the                        |
| 4        | my                         |
| ...      | ...                        |

Each data record in this example data table may include: a non-subject matter keyword id data field storing a unique id associated with the non-subject matter keyword tokenized from the character string and stored within the data record; and a non-subject matter keyword data field storing the token/character string making up the non-subject matter keyword.

In the example data table above, server(s) 110 can receive the non-subject matter keyword data 145 from the subject matter UI seen in FIG. 3, automatically identify one or more tokens within the received non-subject matter keyword data 145 (e.g., "a, an, the, my, ... "), and automatically generate and store data records for each of the tokens identified in the non-subject matter keyword data 145, the data record having non-subject matter id 1 storing the non-subject matter keyword "a," the data record having non-subject matter id 2 storing "an," and so on. This example non-subject matter data table may also include additional data records that may have been subsequently entered from the subject matter UI controller, or automatically generated by the server(s) 110 using the machine learning algorithms described below.

With reference now to FIG. 4, an HR user may access an HR UI, such as the non-limiting example UI seen in FIG. 4. This UI may include one or more UI controllers configured to receive input from the HR user. As seen in FIG. 4, these UI controllers may include, but are not limited to: one or more employee name and/or location UI controllers configured to receive input of the employee's name and/or location; one or more employee contact UI controllers configured to receive one or more contact types (e.g., corporate email, corporate social media, etc.) and/or contacts (e.g., email address, social media handle, etc.) associated with an employee; one or more employee title/position UI controllers configured to receive a title and/or position name associated with an employee, and the dates of the title/position; one or more organization UI controllers configured to receive a name of an organization and/or company (organization) associated with an employee, a partnership with another organization, if applicable, and the dates of the partnership; one or more restriction UI controllers configured to receive a title/description of a restriction and/or confidentiality agreement (restriction) on employees, the restriction type, one or more employees bound by the restriction, if applicable, and the dates of the restriction. After the data is input into the provided UI controllers, the user may submit the data. The client computer 120 that displayed the UI may transmit the input data to the server(s) 110.

Server(s) 110 may receive the transmission, including organization/partner data 150, and store the organization/partner data 150 within database 130. In some embodiments, the organization/partner within the organization/partner data 150 may be stored within its own data record, in a data table storing organizations or partnerships, such as the example data table below.

| org-id | org-name          | part-id | start         | end           |
|--------|-------------------|---------|---------------|---------------|
| 1      | Example Inc.      | 2       | Jan. 1, 2016  | Dec. 31, 2016 |
| 2      | Social Media Corp.| 1       | Jan. 1, 2016  | Dec. 31, 2016 |
| ...    | ...               | ...     | ...           | ...           |

Each data record in this example data table may include: an organization id data field storing a unique id associated with the organization stored within the data record; an organization name data field storing the name of the organization; a partner id referencing a data record within the organization/partner data table and identifying a partner organization associated with the keyword id; a start date of the partnership between the organization identified in the organization id and the organization identified in the partner id; and an end date of the partnership.

In the example data table above, server(s) 110 can receive the organization/partner data 150 from the HR UI seen in FIG. 4, automatically identify one or more organizations within the received organization/partner data 150 (e.g., "Social Media Corp."), and automatically generate and store data records for each of the organizations identified in the organization/partner data 150, the data record having organization id 2 storing the organization "Social Media Corp." with a partnership id referencing organization id 1 (which may have been previously input), a partnership start date of 1/1/16, and an end date of 12/31/16.

The transmission from the HR UI on client computer 120 to server(s) 110 may also include restriction data 155, including one or more restrictions on an employee's ability to share information with other employees. Server(s) 110 may receive the restriction data 155, and store the restrictions from the restriction data 155 within the database 130. In some embodiments, each of the restrictions identified within the restriction data 155 may be stored within its own data record, in a data table storing one or more restrictions, such as the example data table below.

| rest-id | restriction | restriction-type | score |
|---|---|---|---|
| 1 | Internal Intranet Policies | Proprietary Technology | −20 |
| 2 | Intranet Contract | Government Contract | −20 |
| ... | ... | ... | ... |

Each data record in this example data table may include: a restriction id data field storing a unique id associated with the restriction stored within the data record; a restriction name data field storing the name of the restriction; a restriction type data field storing the type of restriction; and a score data field defining the amount an employee score total (described below) should be reduced for the restriction defined in the data record.

In the example data table above, server(s) 110 may have received the restriction data 155 from the HR UI seen in FIG. 4, automatically identified one or more restrictions and, where applicable, restriction types within the received restriction data 155 (e.g., "Internal Intranet Policies" and "Proprietary Technology" respectively), and automatically generated and stored data records for each of the restrictions identified in the restriction data 155, the data record having restriction id 1 storing the restriction "Internal Internet Policies" with restriction type "Proprietary Technology" and a score reducing the employee score by 20. This example subject matter data table also includes additional data records (e.g., restriction id 2) that may have been subsequently input into, and received from, the subject matter UI.

The transmission from the HR UI on client computer 120 to server(s) 110 may also include employee data 160, including an employee name and location. Server(s) 110 may receive the employee data 160, and store the employee name and location from the employee data 160 within the database 130. In some embodiments, each of the employees identified within the employee data 160 may be stored within its own data record, in a data table storing one or more employees, such as the example data table below.

| emp-id | employee-first-name | employee-last-name | org-id | rest-id |
|---|---|---|---|---|
| 1 | John | Doe | 2 | 1 |
| 2 | Jane | Doe | 1 | |
| ... | ... | ... | ... | ... |

Each data record in this example data table may include: an employee id data field storing a unique id associated with the employee stored within the data record; a first name data field storing the first name of the employee; a last name data field storing the last name of the employee; an organization id referencing a data record within the organization data table and identifying an organization associated with the employee id; and a restriction id referencing a data record within the restriction data table and identifying a restriction associated with the employee id.

In the example data table above, server(s) 110 can receive the employee data 160 from the HR UI seen in FIG. 4, automatically identify the employee name, organizations and any restrictions within the received employee data 160 (e.g., "John Doe," "Social Media Corp.," "Proprietary Technology," etc.), and automatically generate and store data records for each of the employees identified in the employee data 160, the data record with employee id 1 storing the first name "John," the last name "Doe," an organization id of 2 referencing Social Media Corp. in the organization table, and a restriction id identifying "Proprietary Technology" in the restriction data table. This example employee data table also includes additional data records (e.g., employee id 2) that may have been subsequently input into, and received from, the HR UI.

The transmission from the HR UI on client computer 120 to server(s) 110 may also include employee contact data 165, including an employee contact and an employee contact type. Server(s) 110 may receive the employee contact data 165, and store the employee contact and contact type from the employee contact data 165 within the database 130. In some embodiments, each of the employees contacts identified within the employee contact data 165 may be stored within its own data record, in a data table storing one or more employee contacts, such as the example data table below.

| empcnt-id | emp-id | contact-type | contact |
|---|---|---|---|
| 1 | 1 | Email | john.doe@smc.com |
| 2 | 1 | Social Media | @johndoe |
| 3 | 2 | Email | jane.doe@exampleinc.com |
| 4 | 2 | Social Media | @janedoe |
| ... | ... | ... | ... |

Each data record in this example data table may include: an employee contact id data field storing a unique id associated with the employee contact stored within the data record; an employee id referencing a data record within the employee data table and identifying an employee associated with the employee contact; a contact type data field storing the type of contact (e.g., employee phone number, employee email, employee IM or social media handle, etc.); and a contact data field storing the contact.

In the example data table above, server(s) 110 may have received the employee contact data 165 from the HR UI seen in FIG. 4, automatically identified the employee contact and the type of contact within the received employee contact data 165 (e.g., "john.doe@smc.com," "Email," etc.), and automatically generated and stored data records for each of the employees contacts identified in the employee data 165, the data record with employee contact id 1 storing an employee id of 1 referencing John Doe, an email type of "Email" and the email address "john.doe@smc.com." This example employee contact data table also includes additional data records (e.g., employee contact id 3-4) that may have been subsequently input into, and received from, the HR UI.

The transmission from the HR UI on client computer 120 to server(s) 110 may also include employee qualification data 170, including an employee qualification, an employee qualification type, and the dates of the qualification (not shown in FIG. 4). Server(s) 110 may receive the employee qualification data 170, and store the employee qualification, the qualification type, and the dates from the employee qualification data 170 within the database 130. In some embodiments, each of the employee qualifications identified within the employee qualification data 170 may be stored within its own data record, in a data table storing one or more employee qualifications, such as the example data table below.

| qual-id | emp-id | qualification type | qualification | date |
|---------|--------|--------------------|---------------|------|
| 1 | 1 | Degree | BS, Computer Science, web developer emphasis | Jan. 1, 2010 |
| 2 | 1 | Certification | PHP certification | Jan. 1, 2014 |
| 3 | 1 | Conference | Social Media Conference | Jan. 1, 2016 |
| 4 | 2 | Certification | ASP certification | Jan. 1, 2014 |
| ... | ... | ... | ... | ... |

Each data record in this example data table may include: an employee qualification id data field storing a unique id associated with the employee qualification stored within the data record; an employee id referencing a data record within the employee data table and identifying an employee associated with the employee qualification; a qualification type data field storing the type of qualification (e.g., Degree, certification, conference, etc.); a qualification data field containing a description of the qualification (e.g., BS, CS, web development emphasis, PHP certification, etc.); and a qualification date data field indicating the date of the qualification.

In the example data table above, server(s) 110 can receive the employee qualification data 170 (not shown in FIG. 4), automatically identify the employee qualification and the type of qualification within the received employee qualification data 170, and automatically generate and store data records for each of the employee's qualifications identified in the employee qualification data 170, the data record with qualification id 1 storing an employee id of 1 referencing John Doe, a qualification type of "Degree," a qualification "BS, Computer Science, web development emphasis," and a qualification date of 1/1/10. This example employee qualification data table also includes additional data records (e.g., employee qualification id 2-4) that may have been subsequently input into, and received from, the HR UI.

The transmission from the HR UI on client computer 120 to server(s) 110 may also include employee title/position data 175, including an employee position title, and the dates that the employee held the position with that title. Server(s) 110 may receive the employee title/position data 175, and store the employee title/position and dates from the employee title position data 175 within the database 130. In some embodiments, each of the employees positions identified within the employee title/position data 175 may be stored within its own data record, in a data table storing one or more employee titles/positions, such as the example data table below.

| tp-id | emp-id | title-position | start | end |
|-------|--------|----------------|-------|-----|
| 1 | 1 | Web Developer | Jan. 1, 2010 | Jan. 1, 2016 |
| 2 | 1 | Scrum Master | Jan. 1, 2014 | Jan. 1, 2016 |
| 3 | 1 | Project Manager | Jan. 1, 2016 | |
| 4 | 2 | Web Developer | Jan. 1, 2014 | |
| ... | ... | ... | ... | ... |

Each data record in this example data table may include: an employee title/position id data field storing a unique id associated with the employee title/position stored within the data record; an employee id referencing a data record within the employee data table and identifying an employee associated with the employee title/position; a title/data field containing a description of the title/position (e.g., Web Developer, Scrum Master, etc.); a start date data field indicating the start date of the position, and an end date data field indicating the end date of the position.

In the example data table above, server(s) 110 can receive the employee title/position data 175 from the HR UI seen in FIG. 4, automatically identify the employee title/position and the dates of the position within the received employee title/position data 175 (e.g., "Project Manager," "1/1/16," etc.), and automatically generate and store data records for each of the employees titles/positions identified in the employee title/position data 175, the data record with employee title/position id 1 storing an employee id of 1 referencing John Doe, a title/position of "Project Manager," a position start date of 1/1/16, and no end date. This example employee title/position data table also includes additional data records (e.g., employee title/position id 3-4) that may have been subsequently input into, and received from, the HR UI.

With reference now to FIG. 5, an HR user, or a project manager, may access a project management UI, such as the non-limiting example UI seen in FIG. 5. This UI may include one or more UI controllers configured to receive input from the HR user or project manager. As seen in FIG. 5, these UI controllers may include, but are not limited to: one or more project team UI controllers configured to receive input of the team assigned to the project; one or more project name UI controllers configured to receive a name of the project; one or more project date UI controllers configured to receive a start date and an end date for the project; one or more project goal/mission/objective UI controllers configured to receive a description of the goals, missions or objectives of the project; one or more team member UI controllers configured to receive and/or display the names of the employees/team members assigned to the project; one or more friendly team UI controllers configured to receive identification of one or more teams likely to share information about a subject matter and the reasons they are likely to share the information; and one or more competitor team UI controllers configured to receive identification of one or more project teams unlikely to share information about the subject matter, and the reasons they are unlikely to share the information. After the data is input into the provided UI controllers, the user may submit the data. The client computer 120 that displayed the UI may transmit the input data to the server(s) 110.

Server(s) 110 may receive the transmission, including employee project data 180, and store the project data 180 within database 130. In some embodiments, the employee project within the project data 180 may be stored within its own data record, in a data table storing projects, such as the example data table below.

| prj-id | prj-tm-id | emp-id | project | mission | start | end | cmp-tm-id |
|---|---|---|---|---|---|---|---|
| 1 | 1 | 1, 2 | Social Media Intranet | Improve corporate and partner transparency . . . | Jan. 1, 2016 | Dec. 31, 2016 | 2 |
| 2 | 2 | 3, 4 | Social Media Intranet (Proposed) | Improve corporate and partner transparency . . . | Jan. 1, 2016 | Dec. 31, 2016 | 1 |
| . . . | . . . | . . . | . . . | . . . | . . . | . . . | . . . |

Each data record in this example data table may include: a project id data field storing a unique id associated with the employee project stored within the data record; a project team id data field storing an id for the team assigned to the project; one or more employee ids referencing data records within the employee data table and identifying one or more employees associated with project team assigned to the project; a project name data field storing a title of the project (e.g., "Social Media Intranet"); a project mission data field storing a goal, mission, or objective for the project; a start date data field indicating the start date of the project; and an end date data field indicating the end date of the project; and a competition team id referencing a data record within the project data table and identifying a project team associated with the keyword id that is unlikely to share information on a related subject matter.

In the example data table above, server(s) 110 can receive the employee project data 180 from the project management UI seen in FIG. 5, automatically identify the project team (including team employees), project name, project mission, project start date, project end date, and competing team(s) within the received employee project data 180 (e.g., "WebDev Team 1," "Social Media Intranet," "Improve corporate . . . ," "1/1/16," "12/31/16," "WebDevTeam 2," etc.), and automatically generate and store data records for each of the employee projects identified in the employee project data 180, the data record with employee project id 1 storing a team id of 1, including employee ids of 1 and 2 (referencing John Doe and Jane Doe respectively), a project name of "Social Media Intranet," a project mission of "Improve corporate and partner transparency . . . " a project start date of 1/1/16, a project end date of 12/31/16 and a competing team id of 2, referencing WebDev Team 2, working on a similar project and unlikely to provide information on the subject matter. This example employee project data table also includes additional data records (e.g., project id 2) that may have been subsequently input into, and received from, the project management UI.

With reference now to FIG. 6, an employee system user, or a support staff employee working with the employee user, may access an event UI, possibly a calendar event scheduling UI, such as the non-limiting example UI seen in FIG. 6. This UI may include one or more UI controllers configured to receive input from the employee user or support staff employee. In some embodiments or aspects of the disclosed invention, the input may be received from a GPS or other location software. As seen in FIG. 6, the UI controllers in the example UI may include, but are not limited to: one or more event name UI controllers configured to receive input describing the event; one or more event date UI controllers configured to receive a start date and an end date for the event; one or more event location UI controllers configured to receive the location of the event (e.g., an address for the event); and one or more event room UI controllers configured to receive a room for the event (e.g., a room inside the address at the location, such as a meeting room or a ballroom in a convention center) After the data is input into the provided UI controllers, the user may submit the data. The client computer 120 that displayed the UI may transmit the input data to the server(s) 110.

Server(s) 110 may receive the transmission, including employee event data 185, and store the event data 185 within database 130. In some embodiments, the employee event within the event data 185 may be stored within its own data record, in a data table storing events, such as the example data table below.

| evt-id | emp-id | event-type | event-desc | location | rm | start | end |
|---|---|---|---|---|---|---|---|
| 1 | 1 | Conference | Social Media Intranet Web Developers Conference | Grand Hotel, 123 Main Street, Tucson, AZ | 3 | Jan. 1, 2016 | Jan. 3, 2016 |
| 2 | 1 | GPS Location | Social Media Intranet Meeting, Tucson Office | Tucson, AZ | 5 | Jan. 2, 2016 | Jan. 2, 2016 |
| 3 | 2 | GPS Location | Social Media Intranet Meeting, Tucson Office | Tucson, AZ | 5 | Jan. 2, 2016 | Jan. 2, 2016 |
| . . . | . . . | . . . | . . . | . . . | . . . | . . . | . . . |

Each data record in this example data table may include: an event id data field storing a unique id associated with the employee event stored within the data record; an employee id referencing a data record within the employee data table and identifying an employee associated with event; an event type data field storing a type or source of the event (e.g., generated from a calendar scheduling or conference registration software, or determined from a GPS location software); an event data field storing a name or description of the event; an event location data field storing a name or description of the location of the event; an event room data field storing a name or description of a room for the event (possibly within the location in the location data field; an event start date data field storing the start date of the event; and an event end date data field storing an end data for the event.

In the example data table above, server(s) 110 can receive the employee event data 185 from the event UI seen in FIG. 6, automatically identify the event, and the employee, type, location, room, start date, and end date associated with the event within the received employee event data 185 (e.g., "Social Media Intranet Web Developers Conference," "Conference," "Grand Hotel," "Room 3," "1/1/16," "1/3/16," etc.), and automatically generate and store data records for each of the employee events identified in the employee event data 185, the data record with employee event id 1 storing an event id of 1, including employee id 1 (referencing John Doe), an event type of "Conference," an event name/description of "Social Media Intranet Web Developers Conference," an event location of "Grand Hotel . . . ," an event room of "3," an event start date of 1/1/16, and an event end date of 1/3/16. This example employee event data table also includes additional data records (e.g., project id 2-3) that may have been subsequently input into, and received from, the event UI.

Server(s) 110 may be configured to analyze the aggregated employee contact (including related communications), qualification, title/position, projects, and event data to determine an expertise level associated with each employee for each subject matter in the database 130. To accomplish this, server(s) 110 may generate and store employee expertise score data, possibly stored as data records within an employee score data table, such as the example data table below.

| scr-id | emp-id | kw-id | Date | score |
|---|---|---|---|---|
| 1 | 1 | 1 | Jan. 1, 2016 | 10 |
| 2 | 1 | 1 | Jan. 1, 2016 | 10 |
| 3 | 1 | 2 | Jan. 2, 2016 | 10 |
| 4 | 2 | 2 | Jan. 2, 2016 | 10 |
| ... | ... | ... | ... | ... |

The employee score data table may be automatically populated by the server(s) 110, as server(s) 110 analyze the aggregation of data described above. For example, the server(s), without user input, may identify each of the employee contacts for each employee in the employee contact data 165, and monitor each communication utilizing the identified employee contact. Using the example aggregated employee data above, server(s) 110 may identify employees John Doe and Jane Doe from the employee data table, and using the employee id data field, select data records from the employee contact data records that store the employee id for John Doe and Jane Doe (employee id 1 and 2 respectively).

Using these associated data fields, server(s) 110 may automatically determine that John Doe has an email address of john.doe@smc.com, and Jane Doe has an email address of jane.doe@exampleinc.com. Server(s) 110 may then monitor each email sent and received from these email addresses, and as these transmissions occur, analyze character strings within the transmission, such as the text of the body or subject line. Server(s) 110 may then select each keyword within the subject matter keyword data table, to determine if the token within the communication matches the keyword in the subject matter keyword data table. If so, server(s) 110 may automatically insert a data record into the employee score data table associating the employee with the identified keyword match. Using the data record with score id 1 in the employee score data table above as an example, employee id 1 from the employee data table, John Doe, is associated with keyword id 1 from the keyword data table, "web," because server(s) 110, on Jan. 1, 2016, automatically matched the token "web," within an email to or from John Doe, with the keyword "web," within the keyword data table.

Similarly, server(s) 110 may, without user input, analyze existing data records associated with the employee throughout the aggregated data. For example, server(s) 110 may select each qualification, title/position, project, or event data record in the aggregation associated with a specific employee and tokenize each data field within these data records that includes a character string, such as the name or description data fields in each record. Server(s) 110 may then select each keyword within the subject matter keyword data table, to determine if the token within the qualification, title/position, project, or event data record matches the keyword in the subject matter keyword data table. If so, server(s) 110 may automatically insert a data record into the employee score data table associating the employee with the identified keyword and the match was determined.

Using the data record with score id 2 in the employee score data table above as an example, employee id 1 from the employee data table, John Doe, is associated with keyword id 1 from the keyword data table, "web," because server(s) 110 automatically matched the token "web," within the title/position data table (e.g., "Web Developer"), with the keyword "web," within the keyword data table on Jan. 1, 2016. Likewise, the employee score data records above with score ids of 3 and 4 reflect a GPS location for John Doe and Jane Doe (employee ids 1 and 2 respectively), indicating both employees were present at a meeting involving the token "intranet," which server(s) 110 may automatically determine corresponds to keyword id 3. Server(s) 110 may then automatically generate employee score ids 3 and 4, reflecting a match between the tokens within the employee event data records and the keywords in the keyword data table.

Logic within the software algorithms running within the memory of, and executed by processors on, server(s) 110 may determine a score associated with each match between the communication tokens and the keywords in the subject matter keyword data table. For example, for each match in the employee score data table above, the software logic has assigned a score of 10 to be stored in association with the employee and keyword in the data record.

In some embodiments and aspects of the disclosed invention, the score assigned to each match may be increased if the employee score data record is automatically generated from a communication between two employees that share a common event. To identify this common event, server(s) 110 may identify two or more event data records that identify different employee ids, but that share common event name/descriptions, event date/time, event location, and if applicable, event rooms.

This may be demonstrated using the example employee event data table above. In this example data table, server(s) 110 may determine that event data records, with ids 2 and 3 respectively, share a common event type, event description, event location, event room, event start date and event end date, but store different employee ids. Server(s) 110 may determine that a common event was attended by two separate employees. Server(s) 110 may then monitor specific communications between the two identified employees as described above, and if these communications are between the two identified employees, software logic may determine that the score stored within the score data field in the score data record generated from the subsequent communication is increased. For example, server(s) 110 may increase the score stored in the score data field from 10 to 15 for any communications between John Doe and Jane Doe subsequent to the common meeting identified in event data records 3-4.

In some embodiments and aspects of the disclosed invention, server(s) may identify new subject matter keywords or non-subject matter keywords using machine learning. In some example embodiments, the server(s) may analyze all tokens identified within the input data (e.g., communications, employment history or event data records, etc.), and identify additional tokens not found within the subject matter keyword data table, but found in the same character string as known subject matter keywords.

For each of the identified unknown tokens, the server(s) may compare the tokens with a data table of non subject matter keywords, and if the identified unknown token is not found in the subject matter keyword data table or the non subject matter keyword data table, the server(s) may insert the identified unknown token into an unknown keyword data table. For example, if the tokens "developer" or "development" were not found in the subject matter keyword data table, but consistently appeared next to the known keyword "web" in the identified character strings, server(s) 110 may generate the following data record in the following example data table.

| ukw-id | kw-id | subject-matter-keyword | tally |
|--------|-------|------------------------|-------|
| 1      | 1     | developer              | 20    |
| 2      | 1     | development            | 10    |
| ...    | ...   | ...                    | ...   |

Each data record in this table may include an unknown keyword id, an adjacent known keyword id (i.e., found in the same character string), the unknown keyword, and a tally of the number of times the unknown keyword exists in the same input as the associated known subject matter keyword, which is automatically incremented each time the token and keyword appear in the same input.

Each time the token and the subject matter keyword (or another known subject matter keyword) exist in the same input, the tally stored in the data record may be compared to a threshold number defined within software logic or software rules stored in the database, and if the tally is greater than or equal to the threshold number, the unknown keyword may be inserted into the subject matter keyword data table, associated with the adjacent subject matter keyword.

With reference now to FIG. 7, once server(s) 110 have aggregated the employee data and generated employee score data 190 according to the employee's communications or aggregated data, users of the disclosed system may access a UI for generating a list of employees with employee score data 190 associated with a specific subject matter 135, the list possibly ranking the employees from highest employee score to lowest employee score for expertise during a particular date or time. The user may generate the request as a natural language query (e.g., "What employees or partner employees . . ." in FIG. 7) or using a series of UI controllers defining the subject matter and dates, as well as selections for partner employees or restrictions, as seen in FIG. 7. The user may then submit the search to the server(s).

Server(s) 110 may receive the request, and if necessary, identify the required request parameters from the natural language search (e.g., subject matter keywords, dates, restrictions, partnerships, etc.). Server(s) 110 may then use the identified keywords to identify a subject matter associated with the request, for example "web," "development," and "intranet," in FIG. 7. For each keyword identified in the request, server(s) 110 may query database 130 to return all employee score data records associated in the database with that keyword, such as records with score id 1-4 in the table above. Server(s) 110 may then initialize a score total, such as setting the score total to 0, for each employee identified within the returned employee score data records. For example, the score total for John Doe (employee id 1), and for Jane Doe (employee id 2), would be initialized to 0. For each employee score data record associated in the database with that employee, server(s) 110 may add the score from the score data field in that data record to the employee's score total. Thus, using the example employee score data table above, John Doe would have a total score of 30, because 3 separate employee score data records, with a score of 10 points each, are associated with employee id 1.

The server(s) may then generate a preliminary version of the requested list of employees and employee scores for the requested subject matter. Using the example employee score data table above, John Doe, with employee id 1, would have a preliminary score of 30, while Jane Doe, with employee id 2, would have a preliminary score of 10. In this example, it may be assumed that each employee has several additional entries in the employee score data table that would increase each employee's preliminary score.

Server(s) 110 may then query the restriction data 155 and/or project data 180 to determine if each employee score needs to be adjusted according to the employee's likelihood of providing information about the searched subject matter. Specifically, server(s) 110 may analyze the returned restriction data 155 to determine restrictions placed on the employee (e.g., government contracts, proprietary information, local legal restrictions, etc.), and for each restriction identified, reduce that employee's score according to an amount determined by software logic or software rules stored in database 130. Using the example employee and restriction data tables above, John Doe (employee id 1), may be restricted from sharing proprietary technology about intranets due to internal intranet policies, and will therefore have his preliminary score reduced by 20 points. In this example embodiment, the amount to reduce the preliminary score is stored in the restriction table. In other embodiments, the score may be determined within the software algorithms or rules, or stored in another data table, for example.

Similarly, the server(s) may analyze the returned project data to identify competing interests that will make an employee less likely to share information related to the requested subject matter. For example, in the example project data table above, members of WebDev Team 2 are proposing an alternative social media intranet to WebDev Team 1. Thus, although the members of Team 2 are likely to have expertise that would benefit Team 1, members of Team 2 are unlikely to share this information with Team 1, given their competing interests. Any member of Team 2 in the preliminary list may have their score reduced due to their propensity not to share information, and their score may be reduced for each competing interest. The amount to reduce the score may be determined by software logic in algorithms, rules or data tables similar to that described above.

Server(s) 110 may also adjust the employee scores in the preliminary version of the requested list according to the timeliness of the employee's subject matter expertise. To accomplish this, server(s) 110 may determine the date for each of the returned employee score data records associated with that employee, according to the date stored in the date data field. If the number of records or the employee's score during a predetermined period of time is not above a pre-determined threshold, the employee's score from the preliminary version of the requested list of employees may be reduced. For example, if no date range is specified (therefore including the employee's entire employment history), software logic or software rules stored in the software algorithms or in database 130 may identify a threshold amount of entries or a minimum score required during a specific time period (e.g., the most recent quarter). If the defined number of records or score during this time is not reached, the score total for the employee may be reduced according to software logic or rules.

The user may specify a range of dates on the UI (e.g., 1/1/16-12/31/16 in FIG. 7), so that the requested list of employees and employee scores reflect each employee's score as of the dates selected by the user. To accomplish this, the server(s) may query the database for the employee score data records, but limit the returned data records to those that fall within the user's specified dates. The server(s) may then use the techniques above to generate the preliminary version of the requested list (limited to the specified dates) and reduce the scores according to any restrictions or projects within those dates.

Server(s) 110 may generate a list comprising the final score for each employee identifier associated with employee score data records, along with additional notes and/or data from other data tables associated with each employee id. Server(s) 110 may then transmit the results to the client(s) 120 for display, as seen in FIG. 7.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 8:
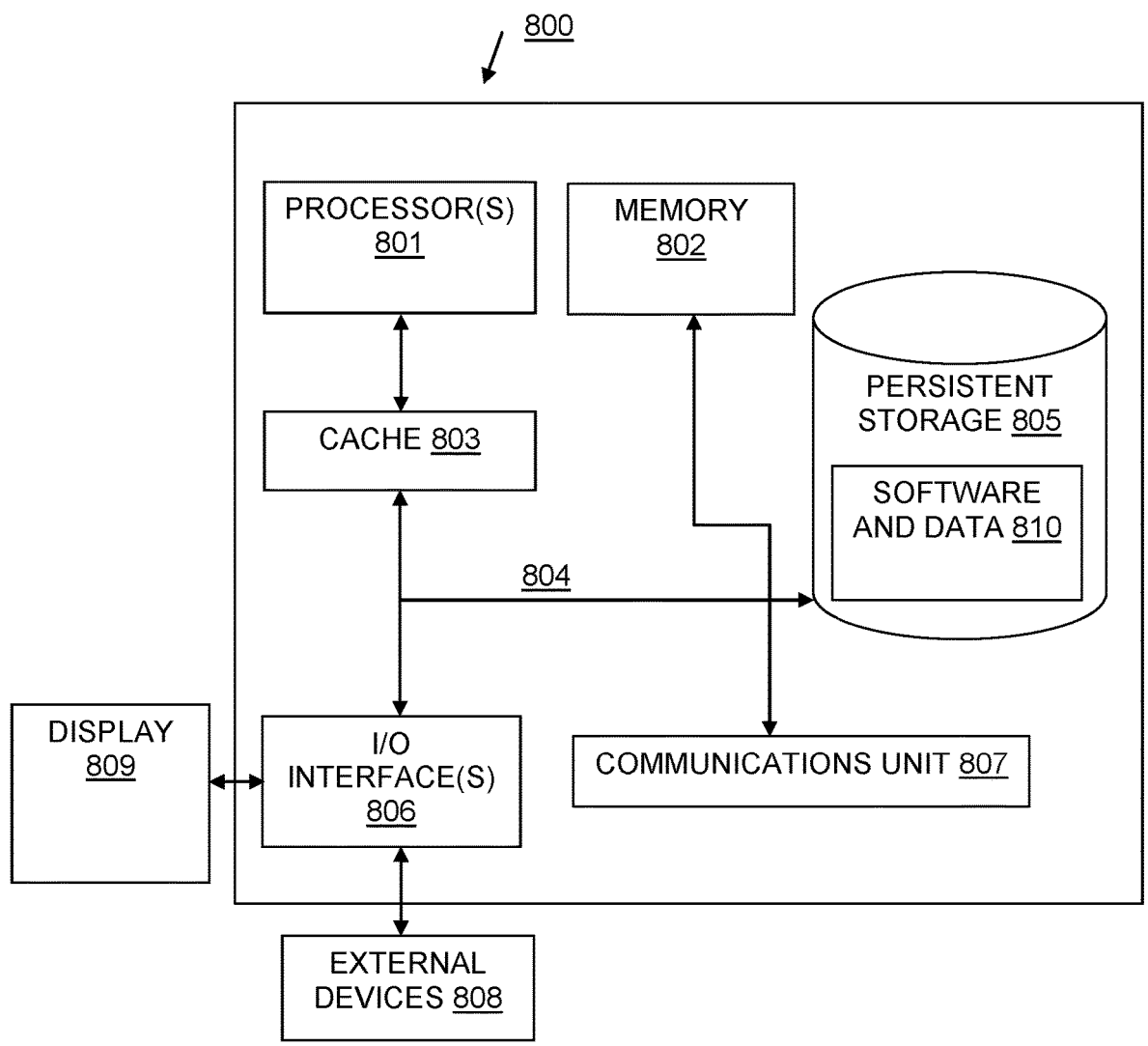
FIG. 8 illustrates a possible system for calculating an expertise score from aggregated employee data.

FIG. 8 depicts computer system 800, which is representative of client device 120 and server 110, in accordance with an illustrative embodiment of the present invention. It should be appreciated that FIG. 8 provides only an illustration of one implementation and does not imply any limitations with regard to the environments in which different embodiments may be implemented. Computer system 800 includes processor(s) 801, cache 803, memory 802, persistent storage 805, communications unit 807, input/output (I/O) interface(s) 806, and communications fabric 804. Communications fabric 804 provides communications between cache 803, memory 802, persistent storage 805, communications unit 807, and input/output (I/O) interface(s) 806. Communications fabric 804 can be implemented with any architecture designed for passing data and/or control information between processors (such as microprocessors, communications and network processors, etc.), system memory, peripheral devices, and any other hardware components within a system. For example, communications fabric 804 can be implemented with one or more buses or a crossbar switch.

Memory 802 and persistent storage 805 are computer readable storage media. In this embodiment, memory 802 includes random access memory (RAM). In general, memory 802 can include any suitable volatile or non-volatile computer readable storage media. Cache 803 is a fast memory that enhances the performance of processor(s) 801 by holding recently accessed data, and data near recently accessed data, from memory 802.

Program instructions and data (e.g., software and data 810) used to practice embodiments of the present invention may be stored in persistent storage 805 and in memory 802 for execution by one or more of the respective processor(s) 801 via cache 803. In an embodiment, persistent storage 805 includes a magnetic hard disk drive. Alternatively, or in addition to a magnetic hard disk drive, persistent storage 805 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 805 may also be removable. For example, a removable hard drive may be used for persistent storage 805. Other examples include optical and magnetic disks, thumb drives, and smart cards that are inserted into a drive for transfer onto another computer readable storage medium that is also part of persistent storage 805. Software and data 810 can be stored in persistent storage 805 for access and/or execution by one or more of the respective processor(s) 801 via cache 803. With respect to client device 120, software and data 810 includes application management programs and applications.

Communications unit 807, in these examples, provides for communications with other data processing systems or devices. In these examples, communications unit 807 includes one or more network interface cards. Communications unit 807 may provide communications through the use of either or both physical and wireless communications links. Program instructions and data (e.g., software and data 810) used to practice embodiments of the present invention may be downloaded to persistent storage 805 through communications unit 807.

I/O interface(s) 806 allows for input and output of data with other devices that may be connected to each computer system. For example, I/O interface(s) 806 may provide a connection to external device(s) 808, such as a keyboard, a keypad, a touch screen, and/or some other suitable input device. External device(s) 808 can also include portable computer readable storage media, such as, for example, thumb drives, portable optical or magnetic disks, and memory cards. Program instructions and data (e.g., software and data 810) used to practice embodiments of the present invention can be stored on such portable computer readable storage media and can be loaded onto persistent storage 805 via I/O interface(s) 806. I/O interface(s) 806 also connect to display 809.

Display 809 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A system comprising at least one processor executing instructions within a memory operatively coupled to a server computer operatively coupled to a network, the instructions causing the server computer to:
compare a plurality of tokens identified within respective character strings of a data record stored in a database with a plurality of keywords stored in a subject matter keyword data table;
identify an unknown token adjacent to a keyword identified within the respective character strings of the data record based, at least in part, on a token not being included in the subject matter keyword data table;
determine a number of instances that the unknown token is adjacent to the keyword identified within the respective character strings of the data record;
insert, in response to the number of instances that the unknown token is adjacent to the keyword identified within the respective character strings of the data record exceeding a predetermined threshold, the unknown token into the subject matter keyword data table, wherein inserting the unknown token further includes linking a keyword identifier of the keyword with the unknown token in the subject matter keyword data table;
receive, from a user interface on a client computer operatively coupled to the network, a transmission encoding:
a request for a listing of a plurality of subject matter experts; and
at least one keyword identifying a subject matter for which the plurality of subject matter experts are requested;
responsive to receiving the transmission, query the database, coupled to the network, to select, from within the database, a plurality of employee score data records comprising the subject matter keyword, the plurality of employee score data records having been automatically generated and stored in the database based on the subject matter keyword data table and responsive to the server receiving an employee calendar event data or an employee communication data associated in the database with the employee calendar event data;
automatically generate a total score for each of a plurality of employees by:
initializing the total score for each employee identified within the plurality of employee score data records retrieved from the database based on adding respective employee scores from the plurality of selected employee score data records associated with each employee;
querying, after generating the initialized total score for each employee identified, restriction data and project data stored in the database and associated with the plurality of employees to determine whether the total score of an employee needs to be adjusted according to a likelihood of the employee to refrain from providing information about the subject matter for which the subject matter expert is requested; and
adjusting the respective total score for each of the plurality of employees based, at least in part, on a timeliness of an employee's previous subject matter expertise, and a total number of restrictions and competing interests indicative of a likelihood of the employee to refrain from providing information about the subject matter for which the subject matter experts are requested; and
transmit the listing to the client computer for display, wherein the listing includes the adjusted total scores associated with each of the plurality of employees.

2. The system of claim 1, wherein:
the plurality of employee score data records each further comprise a date on which an employee score data record was generated; and
the instructions further cause the server computer to:
receive, from the user interface on the client computer, a range of dates; and
limit the query to select only those employee score data records in the plurality of employee score data records within the range of dates.

3. A method, comprising the steps of:
comparing, by a server computer operatively coupled to a network and comprising at least one processor executing instructions within a memory operatively coupled to the server computer, a plurality of tokens identified within respective character strings of a data record stored in a database with a plurality of keywords stored in a subject matter keyword data table;
identifying, by the server computer, an unknown token adjacent to a keyword identified within the respective character strings of the data record based, at least in part, on a token not being included in the subject matter keyword data table;
determining, by the server computer, a number of instances that the unknown token is adjacent to the keyword identified within the respective character strings of the data record;
inserting, by the server computer, in response to the number of instances that the unknown token is adjacent to the keyword identified within the respective character strings of the data record exceeding a predetermined threshold, the unknown token into the subject matter keyword data table, wherein inserting the unknown token further includes linking a keyword identifier of the keyword with the unknown token in the subject matter keyword data table;
receiving, by the server computer, from a user interface on a client computer operatively coupled to the network, a transmission encoding:
a request for a listing of a plurality of subject matter experts; and
at least one keyword identifying a subject matter for which the plurality of subject matter experts are requested;
responsive to receiving the transmission, querying, by the server computer, the database, coupled to the network, to select, from within the database, a plurality of employee score data records comprising the subject matter keyword, the at least one employee score data record having been automatically generated and stored in the database based on the subject matter keyword data table responsive to the server receiving an employee calendar event data or an employee communication data associated in the database with the employee calendar event data;
automatically generating, by the server computer, a total score for each of a plurality of employees by:
initializing the total score for each employee identified within the plurality of employee score data records retrieved from the database based on adding respective employee scores from the plurality of selected employee score data records associated with each employee;

querying, after generating the initialized total score for each employee identified, restriction data and project data stored in the database and associated with the plurality of employees to determine whether the total score of an employee needs to be adjusted according to a likelihood of the employee to refrain from providing information about the subject matter for which the subject matter expert is requested; and adjusting the respective total score for each of the plurality of employees based, at least in part, on a timeliness of an employee's previous subject matter expertise, and a total number of restrictions and competing interests indicative of a likelihood of the employee to refrain from providing information about the subject matter for which the subject matter experts are requested; and transmitting, by the server computer, the listing to the client computer for display, wherein the listing includes the adjusted total scores associated with each of the plurality of employees.

4. The method of claim 3:

wherein the plurality of employee score data records each further comprise a date on which an employee score data record was generated; and further comprising the steps of:
receiving, by the server computer, from the user interface on the client computer, a range of dates; and
limiting, by the server computer, the query to select only those employee score data records in the plurality of employee score data records within the range of dates.

* * * * *